Patented Nov. 14, 1950

2,529,841

UNITED STATES PATENT OFFICE 2,529,841

COMPOSITION RAIL TIE

Harvie W. Goddin and Einar V. Bulow,
Washington, D. C.

No Drawing. Application December 11, 1944,
Serial No. 567,634

1 Claim. (Cl. 106—98)

The present invention relates to a cross-tie for use on a railroad. Heretofore cross-ties have (i. e. most commonly) been made of wood, and they have been provided with various plates and seats for supporting the rails, the rails usually being held in place by spikes driven into the wood. Wood is not a wholly satisfactory material for the reason that it is subject to decay and also it is subject to mechanical wear; it also absorbs water which freezes; water gets into pores and cracks and freezes, etc. These all tend to destroy wooden cross ties.

In accordance with the present invention we propose to construct the body of the railroad tie of a mineral composition which will be resistant to decay and which will be resistant to mechanical wear, and which will be wholly impervious to water and hence resistant to weathering.

The body of the tie is preferably made of granular quartzite, pulverulent pyroxite, pulverulent diatomite and Portland cement as a hardening agent, this mixture being mixed up with water and cast into molds. The mineral "pyroxite" is discussed and described in considerable detail in a co-pending application of H. W. Goddin, Serial No. 552,216, filed August 31, 1944, now Patent No. 2,510,971. As is stated in the application 552,216, when pyroxite is crushed to pass a 200 mesh screen, meaning conditioned and screened to clear it of any foreign matter, usually about 45% is composed of submicroscopic particles.

The word "crushed" and the words "200 mesh screen" are not applicable to pyroxite in the same sense as to granite or other hard stones. The mineral pyroxite in its natural physical state (as mined) is in lumps similar to chalk, and disintegrates by friction and not needing any applied impact force to produce a impalpable powder, all of which is either microscopic or submicroscopic particles.

Without restricting the invention thereto, we give the following formulas which are satisfactory for making the body of the tie. In these formulas the parts are given by volume, throughout.

The term "Portland cement" is hereinafter used in the same sense as in engineering practice, to designate a hydraulic cement made by calcining and clinkering an intimate mixture of calcareous and argillaceous material and grinding to pass a 100 mesh screen.

Formula 1

Parts (by volume)
Pyroxite, powder, substantially all passing 200 mesh _____ 2
Quartzite, passing ⅜ inch screen, held on a 1/16 inch screen _____ 4
Diatomite, powder, substantially passing 150 mesh or better 200 mesh _____ 1
Portland cement _____ 2
Water _____ 2

Formula 2

Pyroxite _____ 3
Quartzite _____ 3
Diatomite _____ 2
Cement _____ 3
Water _____ 3

Formula 3

Pyroxite _____ 2
Quartzite _____ 2
Diatomite _____ 1
Cement _____ 2
Water _____ 2

Preferably the quartzite is composed of three parts, about equal in amounts of (a) through ⅜, held on ¼ inch mesh, (b) through ¼ held on ⅛ inch mesh, and (c) through ⅛ inch held on a 1/16 inch mesh screen. Preferably as much as possible of the particles smaller than 1/16 inch will be sifted out and discarded.

The diatomite is preferably fine enough to substantially all pass a 150 mesh or 200 mesh.

In some cases, as additional precaution, we may add to the above formulas, a small amount of comminuted hard asphalt or an emulsion of asphalt. This material adds to the resiliency and plasticity of the completed tie. About ¼% to a maximum of 1% of asphalt, by volume, is a suitable amount.

The water used in the above formulas may be fresh water or salt water, and if salt water is employed, this may contain 2 to 5% of dissolved common salt. It will be understood that other minerals or aggregates can be added to the above formulas, and to some extent substitute. The quartzite is added as a filler to increase the load-bearing capacity and the particle size is subject to considerable variation. Preferably we crush the quartzite and sift out the major part of the fine dust-like particles which will pass a 1/16 inch screen. Diatomite is added to impart lightness (lowered specific gravity) to the molded ties and for improving the working quality. The Portland cement is used primarily as a hardening agent, and not as an agent for giving strength. The Portland cement is added in the dry state to the dry diatomite, as a hardener, and in the dry state the cement acts primarily on the diatomite. The Portland cement holds the diatomite together, binds it tightly to itself, renders the diatomite tough, dense, inert, callous, insensible, indifferent to hydraulic action, when added to the composition. The term "hardening" is used herein in this sense, and not in the sense of hardening and setting by chemical union with water. The pyroxite greatly improves the working properties and consistency of the aggregate, during mixing and molding, and especially also imparts a very great degree of waterproofness to the molded ties, so that they will not absorb water. The freezing of absorbed water, in the body of the tie, is thereby avoided, and the tie is unaffected by extreme heat and cold. It adds the property of inertness, against all forms of erosion. It will be understood that this is a highly important factor for the reason that the absorption of water and subsequent freezing would greatly shorten the life of a tie. Molded compositions containing pyroxite are accordingly absolutely resistant to weathering and inert, whereby the use of pyroxite in mixtures for making molded ties greatly prolongs the working life of ties so made. In the above formulas it is understood that the minerals may carry their usual or normal percentage of moisture, and if substantially drier than normal the amount of added water can be correspondingly increased. This pyroxite does not absorb any substantial amount of water. In fact it is here used as a "water-proofing" agent. These properties of pyroxite are discussed in the above-mentioned copending application 522,216. The molded composition of matter used in making the tie body is different from a composition wherein hydraulic cement is used as the binder for mineral aggregate, namely ordinary concrete, in several important respects.

(1) It is flexible and not friable. It has a flexibility simulating the flexibility of seasoned white oak wood cross tie, in that nails or spikes can be inserted by force into the molded composition tie body, without causing disintegration.

(2) Heat and water (applied in succession to the tie body) such as burning gasoline followed by cold water, will not cause the tie body to fracture, explode, chip or break or crack.

(3) The molded tie body so prepared is entirely inert. Thus it is entirely free from expansion and contraction by heat and cold, at temperatures between 0° F. and 200° F. Even when exposed to open fire, it does not expand, or will cold (such as 0° C.) cause it to contract.

(4) It will not absorb moisture, even if immersed in water for weeks (or months) at a time.

(5) The composition of matter when formed into a tie body simulates and reacts in a flexible manner, comparable to hard tough woods when exterior force flexures are applied, such as sharp and instant forces; the composition of matter as molded into a tie body does not disintegrate.

(6) It is resistant to dilute acids, whereas ordinary concrete would be rapidly attacked.

(7) The specific gravity of the tie is only about one half that of concrete.

(8) The tie produced can be coated, immersed or otherwise painted with paint of any kind, or compositions of oils, emulsified compounds, and saline solutions, without producing any deterioration or decomposition of the tie. Concrete would be ruined by many kinds of paint. The pigment of the paint (of any kind) applied to the tie produced under the present invention, will be held by the surface and does not peel off after drying. Many paints applied to concrete articles will peel off or flake off after drying, and will cause erosion of the concrete.

(9) The tie body, made as described is, for all practical purposes, a non-conductor of electricity and heat and sound.

The ties can be, for heavy traffic roads, e. g. about 14 to 18 or 20 inches deep and 12–14 inches wide. Such ties can weight about 100–200 lbs. But we are not restricted to these figures.

The ties due to the inclusion of the pyroxite in the composition, will not expand or contract due to heat or cold, and are non-combustible. Since they do not absorb water, they cannot crack from freezing water; they are thus weatherproof, resistant to oil, resistant to chemical action of soil, most acids, most alkalies, and all wood-destroying organisms. They are not subject to buckling and are generally resistant to breakage and free from warping and are composed of chemically inert materials, and are not injuriously affected by extreme heat or extreme cold or other natural causes of erosion.

Portland cement has been given as a preferred hardener. This is particularly advantageous since it does not cause embrittlement of the other components of the tie. Other types of cement, such as Danish or Belgian cement, slag cement, and the like, can be used.

We have referred above to the use of granular quartzite as the preferred coarse component of the mineral composition. In place of quartzite we could employ annabergite or garnierite or greenstone (or mixtures thereof) and the term "quartzite" is used in the appended claim to include these as equivalents.

We claim:

A railroad cross tie, the body of which is composed of a composition containing, by volume, about 22 to about 28% of pulverized pyroxite the great bulk of which can pass a 200 mesh screen abuot 11% to about 19% of pulverized diatomite the great bulk of which can pass a 200 mesh screen, about 27% to about 45% of granular quartzite, substantially all coarser than $\frac{1}{16}$ inch size and about 22% to about 28% of a cement functioning as a hardening agent, which cement in the absence of the pulverized pyroxite, has hydraulic properties.

HARVIE W. GODDIN.
EINAR V. BULOW.

REFERENCES CITED

The following references are of record in the file of this patent:

UNITED STATES PATENTS

| Number | Name | Date |
|---|---|---|
| 223,052 | Mack | Dec. 30, 1879 |
| 742,144 | Affleck | Oct. 27, 1903 |
| 759,852 | Beezer | May 17, 1904 |
| 776,342 | McCormeck | Nov. 29, 1904 |
| 839,702 | Bawer | Dec. 25, 1906 |
| 1,030,230 | Chipley | June 18, 1912 |
| 1,044,925 | Seaman | Nov. 19, 1912 |
| 1,064,817 | Chipley | June 17, 1913 |
| 1,082,684 | Duryee | Dec. 30, 1913 |
| 1,305,522 | Caven | June 3, 1919 |
| 1,320,873 | Langford | Nov. 4, 1919 |
| 1,518,871 | Osborn | Dec. 9, 1924 |
| 1,760,713 | Ochs | May 27, 1930 |
| 2,068,758 | Mumper | Jan. 26, 1937 |
| 2,094,279 | Moses | Sept. 28, 1937 |
| 2,176,862 | Moreton | Oct. 17, 1939 |
| 2,257,833 | Baselin et al. | Oct. 7, 1941 |

FOREIGN PATENTS

| Number | Country | Date |
|---|---|---|
| 24,705 | Great Britain | Dec. 4, 1901 |
| 792,451 | France | July 16, 1935 |
| 458,003 | Great Britain | 1936 |